Oct. 29, 1963  F. V. F. HERMANS  3,108,351
TUNNEL KILN FOR FIRING CERAMIC AND LIKE PRODUCTS
Original Filed March 2, 1960  4 Sheets-Sheet 1
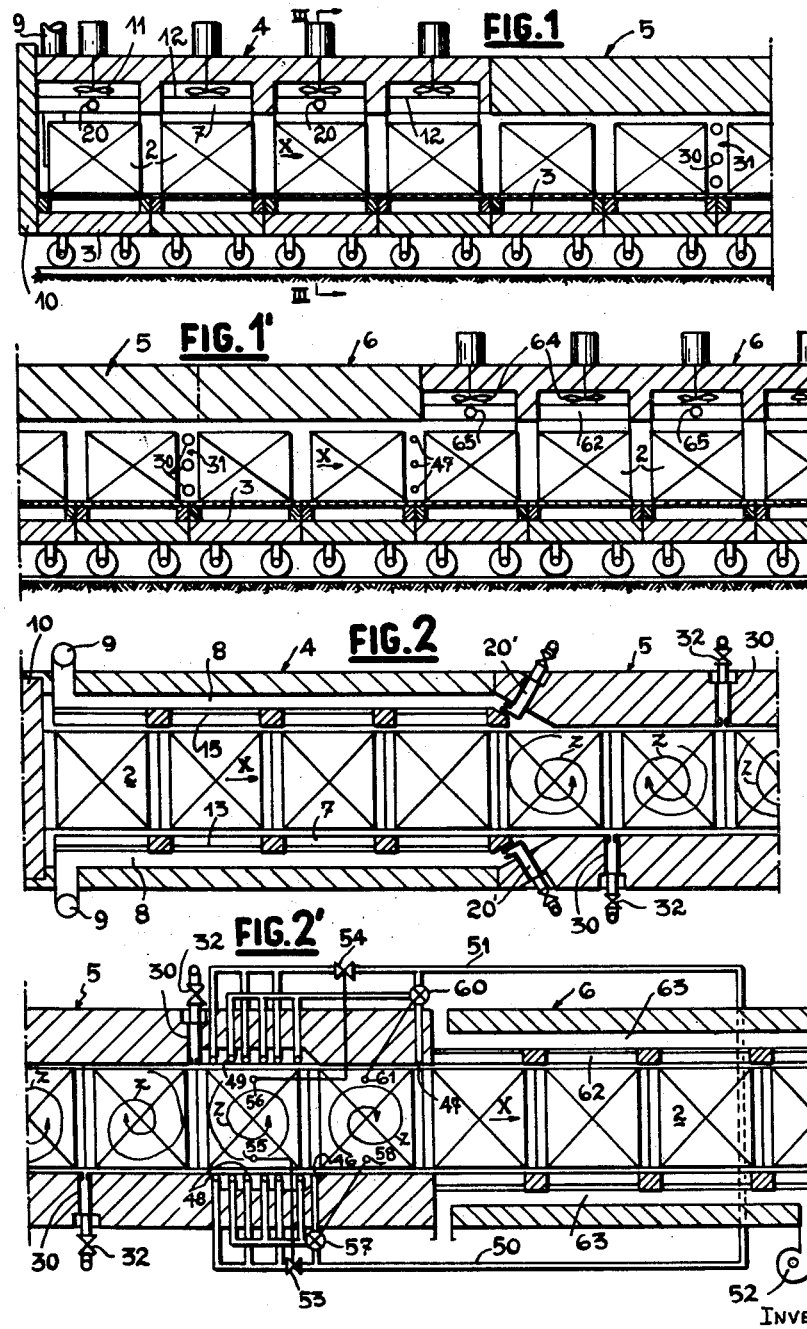
INVENTOR
FERNAND VICTOR FRANÇOIS HERMANS
BY Irvin S. Thompson
ATTORNEY

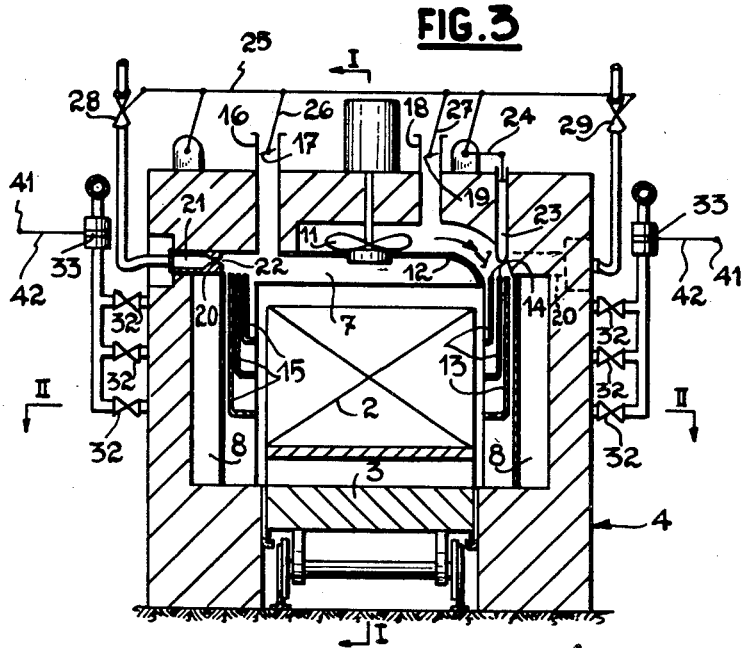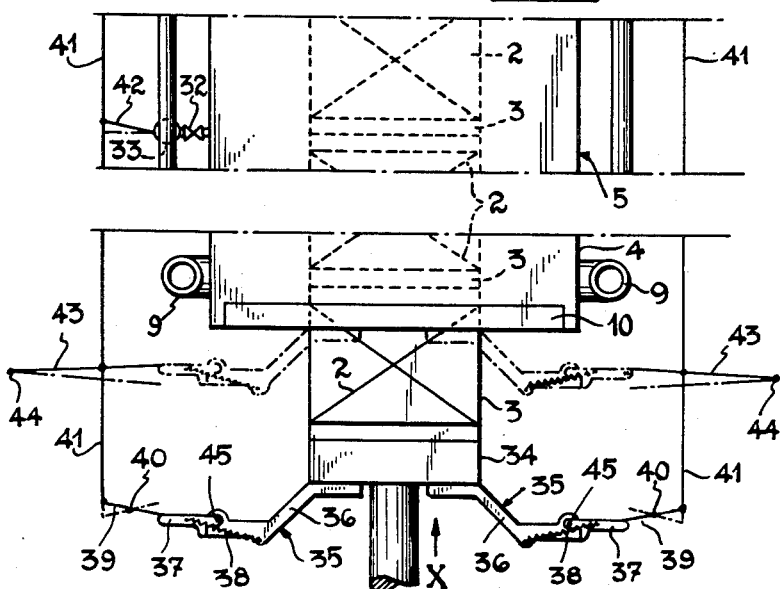

Oct. 29, 1963      F. V. F. HERMANS      3,108,351
TUNNEL KILN FOR FIRING CERAMIC AND LIKE PRODUCTS
Original Filed March 2, 1960      4 Sheets-Sheet 4
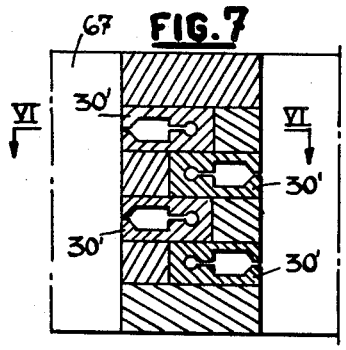
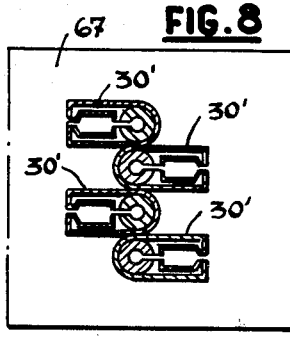
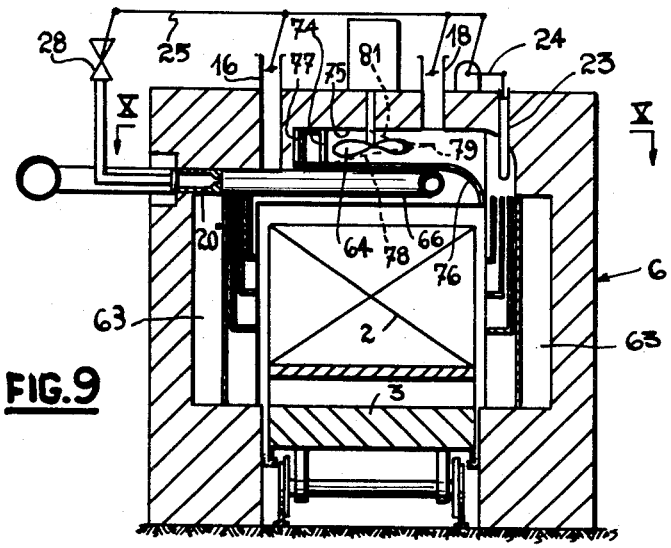
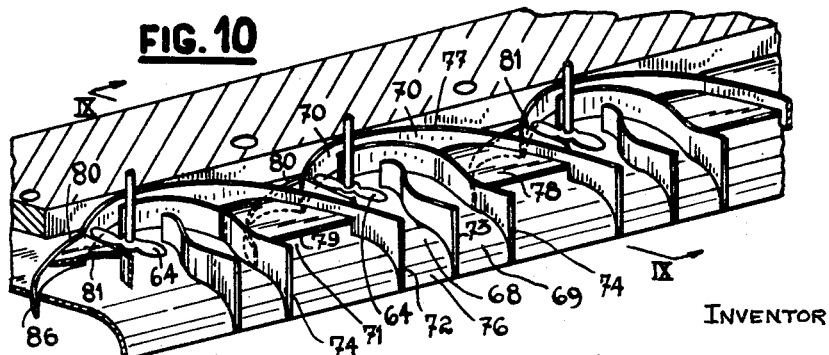
INVENTOR
FERNAND VICTOR FRANÇOIS HERMANS
By Irvin S. Thompson
ATTORNEY

United States Patent Office 3,108,351
Patented Oct. 29, 1963

3,108,351
TUNNEL KILN FOR FIRING CERAMIC
AND LIKE PRODUCTS
Fernand Victor François Hermans, 16 Rue Papenkasteel,
Uccle, Brussels, Belgium
Continuation of application Ser. No. 12,364, Mar. 2,
1960. This application Aug. 24, 1962, Ser. No. 219,335
Claims priority, application Belgium Mar. 6, 1959
10 Claims. (Cl. 25—142)

This application is a continuation of application 12,364 filed March 2, 1960 and now abandoned.

This invention relates to a tunnel kiln for firing ceramic and like products by combustion gases, wherein the products pass seriatim into a preheating zone, into a firing zone which comprises burners and which is hotter than the preheating zone, and into a cooling zone, and wherein the combustion gases evolved by the burners in the firing zone are subsequently used to warm the preheating zone before being removed from the kiln.

In this specification the term "firing of ceramic products" refers to the firing of raw products mainly consisting of ceramic substances and to the firing of products which are mainly ceramic and which have already been fired or which mainly consist of another substance, for instance, metal products, on which it is required to fire a layer of enamel.

Tunnel kilns for firing enamelled or unenamelled ceramic-containing products, such as porcelain, stoneware, glazed earthenware, terra cotta or the like, and which are gas-heated are slow-firing kilns through which the products may take as much as 100 hours to pass. many of the products are very fragile while raw, and therefore frequently break when heated unless they are heated to the same temperature all over. To heat the products uniformly, they are moved slowly through long kilns in which the lengthwise temperature variation is reduced.

In the preheating zone, where the maximum temperature is from 800 to 1000° C., the transfer of heat to the products from the hot gases arriving from the firing zone is relatively slow since radiation heat transfer is relatively reduced and since the rate of movement of the gases in contact with the products is usually well below 2 m./sec. Convection heating is therefore likewise relatively reduced.

With this method of kiln heating it is difficult to provide a heating curve for the products which allows for their special fragility at temperatures at which variations occur in the crystalline structure of the substance being treated, for instance, spots of quartz or cristo-balito in the case of very flinty refractory products, or the removal of the water of constitution in the case of products like porcelain.

The main reason why it is difficult to control the heating curve is that the preheating zone is heated solely by gases supplied from the firing zone and which move in countercurrent to the products being treated. Consequently any temperature variation in a cross-section of a particular kiln through which the gases pass reacts on the temperature of any cross-section through which the gases pass subsequently.

A required heating curve can be provided from specific kiln operating conditions but is difficult to maintain when the density of loading of the moving supports supporting the products varies. This is another result of using countercurrent heating in the preheating zone.

To obviate the difficulties in providing and maintaining the heating curve in tunnel kilns of the kind specified, the kilns are constructed of masonry which is very heavy and which therefore has considerable heat inertia. In other words, endeavours are made to stabilise the heating curve by using the heat reserve effect of conventional refractory masonry which is, of course, heavy. When such masonries are used, cracks occur when the kiln is set in operation due to the masonries having different coefficients of expansion from one another, for the masonries are made of varying compositions and have widely differing temperatures in different parts of the kiln. Also when the load varies the heating curve of the products varies also since the various masonries have different heat-absorption capacities from one another. Also, a very long time is required to provide the required curve when the kiln is started up, consequently it is preferred to continue heating the kiln at week ends rather than to shut it down. Another disadvantage is that staff must be kept on during holidays to remove the fired products from the kiln, for the finished products are delivered a very long time after they have been placed in the kiln.

To obviate the difficulty of providing and maintaining the heating curve in a tunnel kiln for firing ceramic products, the kiln has been heated solely by a large number of electric resistances which are distributed over the length of the kiln and which can be controlled individually. As a rule, an automatic individual control by thermostats is provided. Some electric kilns of this type are built of substances which are light and which therefore have a reduced heat inertia, but the treatment time is still prolonged because the rate at which the products move in the firing zone must be low to ensure all-over temperature uniformity of the products. In such a kiln, heating is mainly by radiation and it is impossible to equalise the temperature of the places subjected to direct radiation from the heating resistance to the places not so subject. So far it has been impossible to use fans to provide a high-speed movement of the gases in the parts of the kiln where temperatures are above about 800° C., yet temperatures of this order or even higher are required to fire ceramic products.

Even if constructed of low-heat-inertia materials, electric tunnel kilns of this kind cannot be stopped frequently unless the connected load in k.v.a. required for rapid restarting is very high, a feature which is very expensive and which is often forbidden by the rules governing connection to an electricity supply system. Also electricity as a heating medium is much more expensive than gas or liquid fuel.

The present invention has for its object to provide a tunnel kiln having gas or liquid heating and which is free from the before mentioned disadvantages of other tunnel kilns.

In the tunnel kiln according to the invention, the firing zone burners are of a known kind in which the combustion gases issue in the form of jets at a speed of at least 100 m./sec., the last-mentioned burners being disposed so that the general pattern of movement of the gases in the kiln moved by such jets resembles vortices having vertical axes. The preheating zone comprises boxes of metal in which the combustion gases from the firing zone move in a counter direction to that of the products, additional burners being arranged to provide individual heating of chambers in the pre-heating-zone through which the products to be preheated pass seriatim. Each of said chambers comprises fans adapted to move the gases in a direction parallel to a plane perpendicular to the longitudinal axis of the kiln at a rate of at least 5 m./sec. which gases engage the products to be preheated. A duct is provided for removing the vapours evolved by the ceramic products to be preheated in the chamber concerned, the various removal ducts being valve-controlled. The preheating, firing and cooling zones are constructed of low-heat-inertia materials.

Consequently, although the temperature in the firing zone is too high to permit the use of fans to speed up convection heating, the kiln gases in engagement with the products being treated can be moved at a considerable rate in the firing zone. Such rate can be more than 5 m./sec. The burners are arranged so that the gases move horizontally between the stacked products as if the kiln gases formed part of vertical-axis vortices. The gases from the firing zone pass through a metal box in the preheating zone and heat the products rapidly without the same coming into contact with the harmful constituents contained in a large volume of gas. Also, if the gases from the firing zone are insufficient and give a variable heating of the products, the required extra heat can readily be provided by burners in the various preheating-zone chambers. The fans therein provide rapid preheating of the products by convection. In no part of the preheating zone do the products come into direct contact with the combustion gases evolved in the preheating zone, so that harmful substances such as steam and some sulphuretted compounds have less chance of affecting the products. The gases evolved in each chamber are removed through the corresponding removal duct simultaneously with the vapours evolved by the products during preheating. The use of low-heat-inertial materials in association with the liquid-fuel or gas heating means makes for rapid starting and renders frequent stoppages of the kiln possible for instance, a shut-down of heating at week-ends. If, with the kiln in operation, the gases from the firing zone supply sufficient heat to the preheating zone, the additional burners in the preheating-zone chambers can be stopped and the valves in the waste-ducts of the preheating zone can be closed.

In some tunnel kilns the zone near the entrance to the kiln comprises gas or liquid-fuel burners, but such known kilns are not kilns for firing ceramic products wherein the same move in counterwise direction to that of the combustion gases heating the firing zone, the known kilns being glass annealing kilns or kilns for decorating glass or metal articles wherein all the heating gases move in the same direction as the products being treated and mix with other gases ensuring the maximum temperature during annealing. In these known kilns the burners near the entrance to the kilns are therefore in operation the whole time. Also, in the case of enamel-decoration kilns the products to be decorated often have to pass into a muffle heated solely externally by the combustion gases to prevent damage to the enamel by such gases.

According to one advantageous feature of the present invention each preheating-zone chamber comprises a thermostat disposed in the high-speed gases engaging the products to be preheated and which controls the fuel supply to the additional burner in the associated chamber.

The additional burners can therefore be turned down automatically if, once the kiln is in full operation, the heat supplied by the gases from the firing zone being sufficient for preheating. If there are variations in the load during normal operation, such as an increase in load density, the additional burners can immediately supply make-up heat. Advantageously, the thermostats can also be used to control the admission of cooling air into the chambers when the temperature therein is excessive.

According to another advantageous feature of the present invention the firing-zone burners are arranged in vertical rows over the entire height of each charge, consecutive rows being disposed alternately in opposite lateral walls, an arrangement which assists the gases in the firing zone to move horizontally as if describing vertical-axis vortices between the treatment products.

To ensure that the high-speed gas jets which issue from the burners do not impinge directly on the products being treated, in cases where the burner axes are in planes perpendicular to the longitudinal axis of the kiln, the vertical rows of burners are disposed in planes separated from one another by the length of the moving supports on which the products being treated are conveyed, such supports being moved intermittently and stopped in positions such that the high-speed gas jets are directed between consecutive batches.

In an alternative method of preventing the high-speed gas jets aforesaid from impinging directly upon the products being treated even where the same are moved continuously, the burners of each vertical row deliver the combustion gases parallel with the longitudinal axis of the kiln. The burners immediately above one another in each vertical row point alternately to opposite ends of the kiln, and each row of burners is disposed in a recess in the corresponding side wall, the ends of the recess opposite the burners exits deflecting the gas streams towards the centre of the tunnel.

In kilns for rapid preheating and firing of ceramic products, the product-cooling means must be adapted for rapid cooling. To this end vertical rows of nozzles are provided for blowing compressed cooling air between the products at the entry of the cooling zone so as to move the gases at the cooling-zone entry after the general fashion of vertical-axis vortices. These nozzles are arranged similarly to the firing-zone burners.

The invention will now be described with reference to the accompanying drawings which illustrate diagrammatically by way of example, some embodiments of a tunnel kiln according to the invention, and in which:

FIGURE 1 is a longitudinal vertical section through the preheating zone and part of the firing zone of a first embodiment of a tunnel kiln according to the invention, the section being taken along the line I—I of FIG. 3;

FIGURE 1' is a section similar to that shown in FIGURE 1 but through that part of the firing zone which is to the right of the part shown in FIGURE 1, and through part of the cooling zone;

FIGURES 2 and 2' are sectional views, taken along the line II—II of FIGURE 3, through the kiln parts illustrated in FIGURES 1 and 1' respectively;

FIGURE 3 is a cross-section taken along the line III—III of FIGURE 1;

FIGURE 4 is a diagrammatic plan view showing how the firing-zone burners can be turned down automatically by means for advancing the products intermittently;

FIGURE 7 is a longitudinal vertical section taken along the line VII—VII of FIGURE 6;

FIGURE 8 is a sectional view, similar to that shown in FIGURE 7, of an alternative form of the burners;

FIGURE 9 is a cross-section though an alternative form of the cooling zone, and

FIGURE 10 is a perspective view of some of the elements shown in FIGURE 9, the view being a horizontal section taken along the line X—X of FIGURE 9.

Like references denote like elements in all the drawings.

Figure 5:
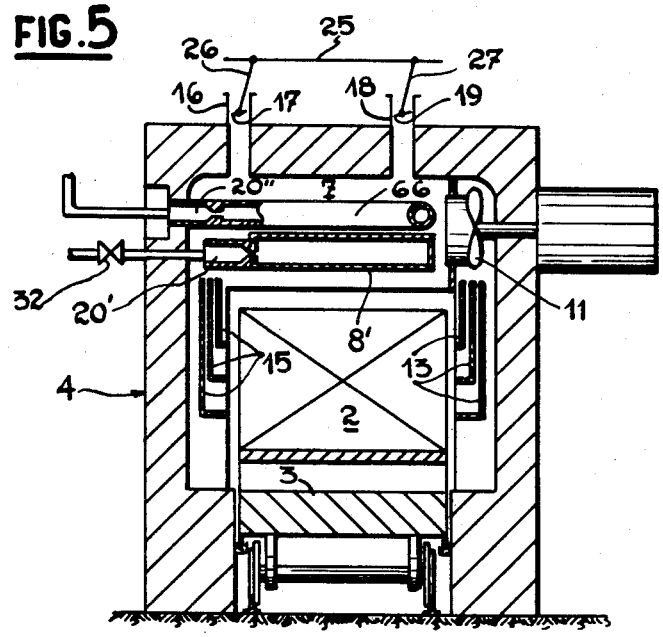
FIGURE 5 is a cross-section similar to the cross-section shown in FIGURE 3 of an alternative form of the preheating zone.

FIGS. 1 to 3 illustrate a tunnel kiln for firing ceramic products such as paving bricks which form stacks or batches 2 on moving tables 3 and which are spaced apart in order that the heat from the kiln may reach the centre of each stack more readily. The table 3 and the products thereon are moved as indicated by an arrow X and pass seriatim to a preheating zone 4, a firing zone 5, and a cooling zone 6.

The preheating zone is divided into a number of chambers 7 adapted to be heated by combustion gases which, having previously heated the firing zone 5 in a manner to be described hereinafter, travel through metal boxes 8 in the opposite direction to the arrow X towards a chimney 9 disposed near the kiln entry. The chimney 9 can be closed by a vertically sliding gate 10.

Since the boxes 8 are metal-walled, the residual heat of the gases in the boxes 8 can be readily transferred to the preheating zone. The heat can be rapidly transferred to the products to be preheated because of the considerable speed at which the kiln gases engage with the products as far as the centre of the stacks 2. The high speed of such gases is produced by fans 11 which are disposed in the chambers 7 and which are adapted to move the gases of the corresponding chamber parallel with a plane perpendicular to the lengthwise axis of the kiln at a rate of at least 5 m./sec. in engagement with the products to be preheated.

The fans 11 are located near the top of each chamber and are separated by a metal partition 12 from the space in which the products move. The fans 11 deliver the gases which they draw in (FIG. 3) in the direction indicated by an arrow Y. The gases are guided between deflectors 13 which are disposed along the lateral walls and the free edges 14 of which are substantially at the level as one another. The deflectors 13 are curved towards the adjacent stack 2 so that the gases penetrate thereinto to different levels. The gases move horizontally through the stack towards the other side wall, to be received between deflectors 15 arranged similarly to the deflectors 13. The general movement of the gases in each chamber 7 is therefore a vortex-like movement around an axis parallel to the lengthwise axis.

When the kiln is in normal operation, the temperature of some of the chambers 7 may become excessive, in which case cooling air can be introduced into the circuit through a duct 16, FIG. 3, having an adjustable valve 17 which can be automatically controlled in a manner to be described hereinafter.

When air is thus introduced into the vortex circuit some of the air delivered by the fan of the corresponding chamber can with advantage be removed in order to disturb as little as possible the thermal conditions in adjacent chambers. To this end, each chamber 7 comprises a gas removal duct 18 provided with a valve 19 which can be controlled automatically in a manner to be described hereinafter.

Some of the gases in the kiln can be removed through the ducts 18 when the ceramic products to be preheated evolve vapours which must be removed very rapidly in order not to harm the quality of the products.

If, while the kiln is in operation, it is supplied with loads which require less heat than the previous loads, the valves 17, 19 can be opened to maintain the required temperatures in the corresponding chambers.

If, however, the furnace is supplied with loads such that the heat supplied by the combustion gases from the firing zone is not enough to heat the new loads rapidly to the required temperature in each chamber 7, or when the kiln is started up, the required temperatures can rapidly be reached in the various preheating-zone chambers of the kiln according to the invention because each such chamber comprises individually controllable additional heating means which, when used in combination with the fans 11, provide a rapid and uniform heating of the products passing through the preheating zone.

The additional heating means in each chamber 7 consist of burners 20 which can be supplied with a liquid or gas fuel. FIGURES 1 and 3 show gas burners of a known kind wherein, due to strong turbulence of the gases in a combustion chamber 21 formed with an exit aperture 22 of reduced cross-section, the gases are burned substantially completely at the exit from the burner and travel in that region at a rate of at least about 100 m./sec. The burners are disposed alternately in the two side walls of the preheating zone.

The burners 20 shown in FIGURES 1 and 3 supply gases for the corresponding chambers and thus greatly help to move the gases in said chambers at a high rate. To ensure that the gases issuing from the burners do not have to move parallel with the kiln axis in order to escape, the valves 19 in the waste ducts can also be opened to a greater or lesser extent. Conveniently, the burners 20 can operate on gas supplies which vary very widely, for instance, in the ratio of 1 to 5. Such variations in the combustion conditions of the burners are sufficient to compensate for any shortcomings in the heat provided by the combustion gases from the firing zone when the loading of the tables 3 varies. When some kilns start up from cold, the amount of heat provided by the burners 20 on maximum fuel supply, plus the heat supplied by the gases from the firing zone, may not be enough to heat up the kiln rapidly, in which case the required extra heat is obtained from one or more make-up burners which are provided in the boxes 8 and which are operated at starting. Two such burners have the reference 20' in FIGURE 2.

The valves 17, 19 can be controlled manually but are more readily controlled automatically by a thermostat 23 in each chamber 7. Such an automatic control is illustrated in diagrammatic form in FIGURE 3, in which a thermostat member is moved in accordance with a variation in kiln temperature and operates a bent lever 24 pivoted to a rod 25 to which are articulated arms 26, 27, rigidly secured to the valves 17, 19.

The thermostat 23 can also automatically control the position of a valve 28 controlling the fuel flow to the burners 20 of the associated chamber. Also shown in FIGURE 3 is a valve 29 which is similar to the valve 23 and which is operated by a rod similar to the rod 25. The valve 29 controls the fuel flow to the burner 20 in the adjacent chamber of the preheating zone.

The firing zone 5 is heated by combustion gases issuing from burners 30 of the same kind as the burners 20 hereinbefore described. The burners 30 are disposed in vertical rows, as 31, placed alternately in opposite side walls of the firing zone. FIGURES 2 and 2' show that the burners 30 of any one vertical row 31 have their axes disposed in the same plane as one another, such plane being perpendicular to the kiln path-wise axis. FIGURES 2 and 2' also show that the axes of consecutive vertical rows are in planes which are perpendicular to the kiln lengthwise axis and which are separated from one another by the length of the tables 3. The tables are moved intermittently, being stopped when the gaps between consecutive stacks 2 are opposite the vertical rows of burners. Consequently the powerful jets of hot gases issuing from the burners do not engage directly with the products being treated but move the gases in the kiln horizontally. The arrangement of consecutive vertical rows in opposite walls leads to a movement of such gases substantially in the form of a series of vortices having vertical axes, such as are diagrammatically indicated by arrow Z in FIGURES 2 and 2'.

The burners 30 are provided with individual control means for regulating the fuel flow to them, in order that the amount of heat evolved at various levels of the vertical-axis vortices may be adapted exactly to the mass of the products to be heated at such levels, for such mass may vary heightwise depending upon the form of the products being treated. The individual control assists in providing a more uniform temperature over the whole height of the stack, despite the fact that the hot gases tend to rise to the top of the tunnel.

Independently of the individual control means 32 of the burners 30, all the burners of any one vertical row can be acted upon by a turn-down member 33 which reduces the heat supplied by the burners 30 while the tables 3 are moving. All the burners in the firing zone are turned down automatically by means of the element which introduces another table into the kiln and simultaneously advances all the other tables. Referring to FIG. 4, such an element is shown in the form of a pusher 34 comprising an abutment 35 on each side. The abutment 35 comprises a part 36 secured to the table and a pivoting finger 37 which is maintained by a spring 38 against the part 36 in a position such that, when the pusher 34 starts to move the row of tables, the finger 37 moves a lever 39 which pivots at 40 and which is articulated to a rod 41 articulated at its other end to an arm 42 rigidly secured to the turndown member 33. The rod 41 is also connected to a lever 43 which pivots around a stationary part 44 disposed on that side of the rod 41 which is opposite to the side where the pivot 40 is placed. Consequently, when the pusher 34 starts to move the tables, the lever 39 and arm 42 pass from the solid-line position to the chain-dotted-line position which corresponds to a considerable reduction in the supply of fuel to the burners 30 of the various vertical rows. Simultaneously, the lever 43 pivots into its chain-dotted-line position.

When the finger 37 engages with the lever 43 in this new position just before the completion of the movement of the pusher 34, the lever 43 is returned to its solid-line position, with the result that the supply to the burners 30 is again controlled by the individual valves 32. During the return movement of the pusher 34, the finger 37 engages with the lever 39 in the solid-line position thereof and pivots against the spring 38 around its pivot 45 so that the pusher 34 can be moved far enough in the opposite direction to that indicated by the arrow X for the following table to be moved readily into a position opposite the entrance to the kiln.

Disposed at the exit of the firing zone 4 are vertical rows of nozzles 46, 47 which have reduced exit cross-sections and which inject compressed cooling air at high speed along planes perpendicular to the longitudinal axis of the kiln. The nozzles 46, 47, are shown in the same masonry as that of the firing zone, but from the operating point of view the last two chambers shown in the masonry 5 form part of the cooling zone. In that part of the kiln lying between the last vertical row of burners 30 and the vertical row of nozzles 46, the firing-zone side walls comprise U-tubes 48, 49 supplied with air, air under pressure being supplied to one arm of the U-tubes through ducts 50, 51 connected to a fan 52. Each duct 50, 51 comprises a valve 53, 54 for controlling the amount of air supplied to the tubes 48, 49. The valve 53 is controlled by a thermostat 55 in the chamber between the tubes 48 and 49, such thermostat controlling the cooling of the last-mentioned chamber. The valve 54 is similarly controlled by a thermostat 56.

The exit of the U-tubes 48 is connected to a mixing valve 57 which is also connected to the duct 50. The mixture of cold air from the duct 50 and of hot air from the tubes 48 is supplied through the nozzles 46, and the temperature of the air supplied to the kiln by the nozzles 46 depends upon the proportion of cold air to hot air as determined by the mixing valve 57 which is controlled by a thermostat 58 disposed in the following chamber.

Similarly, the hot air issuing from the U-tubes 49 is mixed by a valve 60 with cold air from the duct 51 before being supplied to the kiln through the nozzles 47. The mixing valve 60 is controlled by a thermostat 61 similar to the thermostat 58.

The cooling zone 6, only part of which is shown, also comprises chambers 62 similar to the preheating zone chambers 7. The chambers 62 are made of metal (and therefore have low-heat-inertia) boxes externally cooled by cold air supplied to ducts 63 by the fan 52. Fans 64 similar to the fans 11 provide a forced circulation of the gases in the kiln through the stacks 2. Burners 65 similar to the preheating-zone burners 20 can be operated to control the temperature in each chamber 62. In the embodiment illustrated the burners 65 are disposed near the top of each chamber and alternately in the two side walls. Additional cooling-air entry and exit tubes comprising adjustable valves are also provided and are similar to the ducts 16, as shown in FIG. 3.

In the tunnel kiln according to the invention the preheating and firing and cooling zones are made of low-heat-inertia substances in order that the various zones may be readily heated to the required temperature when the kiln is started or when the nature or weight of the products to be treated varies. Advantageously, in those parts of the preheating and cooling zones where the temperature is below 800° C., metal boxes which can withstand such temperatures can be used.

In the embodiment illustrated in FIG. 5, the gases which come from the firing zone and which are used to heat the products in the preheating zone, instead of passing through two lateral boxes 8 separated by a metal wall from the space in which the products move, flow in a metal box 8' disposed near the top of the preheating zone, the fans 11 for high-speed circulation of the atmosphere in each chamber being disposed near one of the side walls.

Referring to FIG. 5, any extra heating required of the chambers is provided through the agency of U-tubes 66 placed near the top of the chamber. Combustion gases from burners 20" similar to the burners 20 shown in FIGS. 1 and 3 pass through the tubes 66, which yield their heat to the gases in the kiln which are moved by the fans 11. This method of heating can be used where there is a risk of the combustion gases from the burners 20 damaging the products being treated although the same may not come into contact with a considerable volume of such gases. This occurs inter alia in the firing of some enamels on to metal products.

If the heat supplied by the radiant tubes 66 to the preheating zone when the kiln is started from cold is not sufficient to heat up the preheating zone rapidly to the required temperature in association with the heat supplied by the gases from the firing zone, the metal boxes can also be provided with one or more make-up burners, such as 20'. One such burner can be seen in the box 8' shown in FIG. 5.

In order not to complicate FIG. 5 unnecessarily, the same shows only the themostat 23 which controls the cool air intake through the ducts 16, the hot gas removal through the ducts 18, and the fuel supply to the burners 20".

Figure 6:
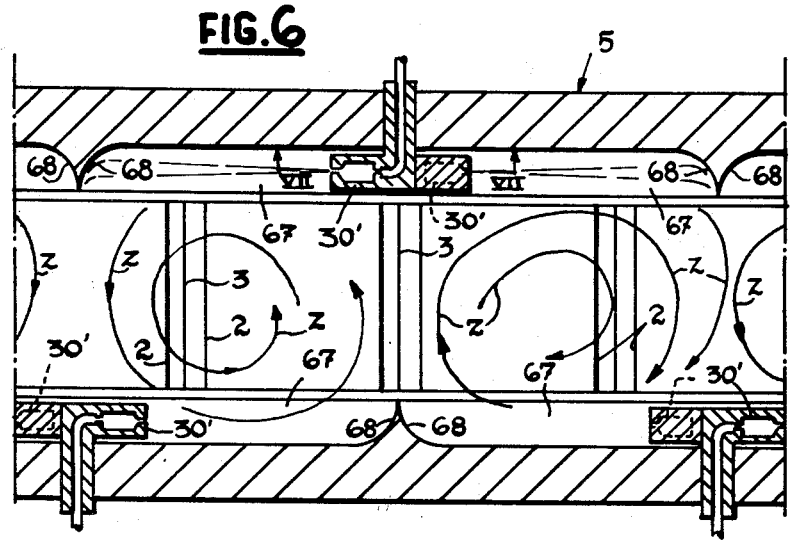
FIGURE 6 is a horizontal section, taken along the line VI—VI of FIGURE 7, through an alternative form of the firing zone of the tunnel kiln according to the invention.

FIGS. 6 and 7 illustrate an alternative form of the firing zone wherein the burners of the various vertical rows do not have their axes extending in planes perpendicular to the longitudinal axis of the kiln as was the case in FIGS. 2 and 2'. The burners of FIGS. 6 and 7 have the reference 30' and the gases issuing therefrom move parallel to the longitudinal axis of the kiln. The burners of any one vertical row point alternately towards opposite ends of the kiln. Each vertical row is disposed in a recess 67 in the associated side wall. Those ends 68 of each recess 67 which are opposite the burners deflect the gas streams towards the center of the tunnel. Since consecutive vertical rows are disposed in opposite side walls, the adjacent ends of two recesses in any one side wall are opposite a row of burners in the opposite side wall, a feature which assists in prolonging vortex-like vertical-axis streams 2.

Since the gas jets are not directed towards the stacks 2 when they issue from the burners 30', the stacks 2 need not be advanced intermittently, nor need the burners be turned down whenever the tables are advanced.

FIG. 8 illustrates an arrangement of burners similar to the arrangement shown in FIG. 7 and differing therefrom merely in the nature of the burners. The burners shown in FIG. 7 are made of a refractory material, while the burners shown in FIG. 8 are made of metal.

FIGS. 9 and 10 illustrate an alternative form of the cooling zone of the kiln according to the invention wherein the temperature of the products can be varied more gradually as the same pass from one chamber 62 to the next. In this embodiment, fans 64 deliver gases towards the same side wall of the cooling zone. Sheaths 68—71 are disposed around each fan 64. The sheaths 68, 69 are bounded laterally by walls 72—74 extending over the entire height which separates the top 75 of the chamber 62 from a sheet-metal member 76. If required, the sheet-metal member 73 can be omitted. The gases supplied to the sheaths 68, 69 pass solely into that chamber 62 above which the corresponding fan 64 is disposed. The sheath 70 directs some of the gases entering it into same chamber and some of the gases entering it into the following chamber. The sheath 70 is limited laterally by the sheet-metal member 74 and by a sheet-metal member 77, at the top by the chamber ceiling 75, and at the bottom by a sheet-metal member 78 which extends towards the ceiling 75 from the corresponding fan 64. The free edge 79 of the member 70 is about half way between the ceiling 75 and the member 76. Some of the gases entering the sheath 71 are directed into the same chamber below the corresponding fan, and some such gases are directed into the previous chamber. The sheath 71 is bounded laterally by the member 72 and by a sheet-metal member 80, at the bottom by the member 76 and at the top by a member 81 (FIG. 9) which extends towards the member 76 from the corresponding fan 64. The free edge of the member 81 merges with the free edge of the member 78 bounding the sheath 70 of the previous chamber.

It will be apparent that the gases which issue from the sheath 70, 71 which terminate one above another at a common free edge 79 mix with one another having passed such edge and form a mixture at a temperature mid-way between the temperatures in the sheaths 68, 69 associated with the consecutive chambers. The products will therefore be cooled more gradually than in the kiln illustrated in FIGS. 1–3.

An arrangement similar to that just described for the cooling zone can be used for the preheating zone to provide a more gradual preheating of the products.

In such a case the gases from the firing zone, and not cool air delivered by a fan, pass through the metal boxes provided in the preheating zone. The vortex-like streams having their axes parallel with the longitudinal axis of the kiln and produced in the various chambers by the fans thereof must then all rotate in the same direction.

The invention is not, of course, limited to the embodiments described; many variations are possible in the form, arrangement and constitution of some of the elements of the invention falling within the scope of the appended claims.

What I claim is:

1. A tunnel kiln for firing ceramic and like products comprising a preheating zone, a firing zone and a cooling zone through which stacks of products are conveyed on moving tables; said preheating zone including a plurality of chambers made of metal, each chamber comprising a fan disposed in one of the walls thereof, deflector members disposed in each side wall of said chamber at varying heights thereover, said deflector members being disposed toward the longitudinal axis of said kiln, said fan and said deflector members moving the atmosphere in each chamber in vortex-like movement around an axis parallel to the longitudinal axis of said kiln, at least one metallic box-like member disposed in said preheating zone, said box-like member communicating with said firing zone to receive the combustion gases therefrom in a direction opposite to the direction in which the products are traveling so as to preheat the atmosphere in said preheating zone without the combustion gases coming into contact with the products, means to exhaust the combustion gases from said box-like member; burners disposed in the side walls of said firing zone, said burners being disposed in vertical rows over substantially the entire height of the firing zone, the vertical rows being arranged alternatively in opposite side walls so that each vertical row in one side wall is disposed substantially midway between two vertical rows in the other side wall, said vertical rows of burners, being so disposed as to direct the combustion gases issuing therefrom in vortices having vertical axes perpendicular to the longitudinal axis of said kiln; said cooling zone including a plurality of further chambers made of metal, each further chamber comprising fan means disposed in the top wall thereof, ducts disposed between the side walls of said kiln and the exterior side walls of said further chamber, a blower fan operatively connected to said ducts to blow cool air therein opposite to the direction in which the products are traveling to gradually cool the products, exhaust means connected to said ducts, and deflector means disposed on the interior of the side walls of said further chambers at varying heights thereover, said deflector means being disposed toward the longitudinal axis of said kiln, said fan means and deflector means moving the atmosphere in each further chamber in vortex-like movement around an axis parallel to the longitudinal axis of said kiln.

2. A tunnel kiln according to claim 1 in which a make-up burner is disposed in said metallic boxlike member adjacent the entrance of the firing zone so as to increase the temperature of the combustion gases when necessary.

3. A tunnel kiln according to claim 1 in which an additional burner is mounted close to the ceiling of each chamber of said preheating and cooling zones to increase the temperature of the atmosphere therein.

4. A tunnel kiln according to claim 3 in which said additional burner is connected to a U-shaped tube disposed adjacent the ceiling of each chamber.

5. A tunnel kiln according to claim 1 in which said box-like member in the preheating zone is mounted adjacent the ceiling thereof.

6. A tunnel kiln according to claim 1 in which each chamber of said preheating and cooling zones comprises first duct means for the passage of cooling air within said chamber to cool the atmosphere therein, second duct means for the removal of gases from said chamber, valve means disposed within said first and second duct means to control opening and closing thereof, thermostat means disposed in said chamber, and means operatively connected between said thermostat means and said valve means to operate said valve means in accordance with said thermostat means.

7. A tunnel kiln according to claim 1 in which each vertical row of burners is disposed in a recess in the side wall of said firing zone, each end of said recess being curved toward the longitudinal axis of the kiln and terminating opposite a vertical row of burners in the opposite side wall, the burners immediately above one another in each vertical row pointing alternately to opposite ends of the kiln so that the combustion gases issuing from each burner travel in said recess in a path parallel to the longitudinal axis of the kiln to the curved portion of said recess whereupon the combustion gases are directed in a plane perpendicular to the longitudinal axis of the kiln.

8. A tunnel kiln according to claim 1 comprising means intermittently displacing the moving tables by the length of the latter, the burners of each vertical row of burners being directed with their horizontal axes in planes perpendicular to the longitudinal axis of the kiln and the alternate vertical rows of burners being disposed so as to direct the horizontal jets of combustion gases between stacks of products during the periods the intermittently moving tables are stationary.

9. A tunnel kiln according to claim 8 further comprising a turn-down member of the fuel supply for each vertical row of burners to provide fuel to all these burners, means intermittently pushing a moving table into the kiln and at the same time intermittently moving the tables already in the kiln, and means operatively connected to said turn-down members and with the means intermittently pushing a moving table into the kiln so that said burners are turned down when said pushing means is moved forward and is turned up when this pushing means is returned towards its initial position.

10. A tunnel kiln according to claim 1 in which at least one vertical row of cooling nozzles is disposed in each side wall of said cooling zone at the entrance thereof, each vertical row of cooling nozzles in one side wall being offset with respect to the vertical row of cooling nozzles in the other side wall, a plurality of U-shaped tubes disposed in each side wall adjacent each vertical row of cooling nozzles, one end of said U-shaped tubes being connected to compressed air means, the other end of said U-shaped tubes being connected to a vertical row of cooling nozzles through a mixing valve, means connecting said mixing valve to said compressed air means, and thermostat means disposed within said kiln and operatively connected to said mixing valve to operate same to mix the air from the other end of said U-shaped tubes and said compressed air means prior to being conducted to the vertical row of cooling nozzles.

References Cited in the file of this patent

UNITED STATES PATENTS

| | | |
|---|---|---|
| 1,522,166 | Wilfrutte | Jan. 6, 1925 |
| 1,615,217 | Dressler | Jan. 25, 1927 |
| 1,701,223 | Bergman | Feb. 5, 1929 |
| 2,081,954 | Phillips | June 1, 1937 |
| 2,133,784 | Murill | Oct. 18, 1938 |
| 2,928,158 | Miller | Mar. 15, 1960 |
| 2,961,732 | Hanley | Nov. 29, 1960 |
| 3,050,811 | De Bartolomers | Aug. 28, 1962 |

FOREIGN PATENTS

| | | |
|---|---|---|
| 457,024 | Great Britain | Nov. 19, 1936 |
| 1,148,967 | France | July 1, 1957 |